United States Patent [19]

Crouse

[11] 4,122,333
[45] Oct. 24, 1978

[54] REFLECTIVE DEVICE AND METHOD FOR ILLUMINATING A SCENE

[76] Inventor: Paton B. Crouse, 1238 111th Ave., NE., Bellevue, Wash. 98004

[21] Appl. No.: 700,550

[22] Filed: Jun. 28, 1976

[51] Int. Cl.² .............................................. G03B 15/02
[52] U.S. Cl. ..................................... 362/18; 354/126; 362/19; 362/277
[58] Field of Search ........................ 240/1.3, 9.5, 41.1, 240/41.3, 41.35 C, 44, 44.1, 103 R; 354/126

[56] References Cited

U.S. PATENT DOCUMENTS

| | | | |
|---|---|---|---|
| 2,876,338 | 3/1959 | Seligson | 240/41.1 X |
| 3,258,586 | 6/1966 | Blizzard | 240/41.1 X |
| 3,491,667 | 1/1970 | Land | 240/1.3 X |

*Primary Examiner*—Richard A. Wintercorn
*Attorney, Agent, or Firm*—Paul R. Audet

[57] ABSTRACT

Reflective device for use with a source of flash illumination, and method, for providing indirect, or, simultaneous direct and indirect illumination of a scene to be photographed. A reflective member, interposed at an angle between the flash source and scene, intercepts flash illumination and reflectively redirects at least a percentage of it for indirect illumination. Reflective member passing means allow some flash illumination therethrough for similtaneous direct illumination, the amount being variable by regulating means such as movable shutters or polarizer sheets mounted on the reflective member. Means are provided for varying the angle of interposition of and for rotating the reflective member. Mounting means for mounting reflective members onto flash units accomodate various removable reflective members.

39 Claims, 19 Drawing Figures

REFLECTIVE DEVICE AND METHOD FOR ILLUMINATING A SCENE

BACKGROUND OF THE INVENTION

This invention relates to methods and means for providing illumination of scenes to be reproduced by cameras. More particularly, it relates to reflective devices for use with sources of flash illumination such as flash units.

The quality of flash photographs has in the past been limited by available flash equipment and the type of illumination produced thereby. One limitation has been that it was not possible to employ a single source of flash illumination to provide simultaneous direct and indirect illumination of a scene to be photographed. Flash equipment available only provided single-source flash illumination in a single direction, such that flash illumination of the scene was either direct or indirect, but not both. Structures such as flash units which house the source of illumination, are usually mounted on a camera and the direction of the axial path of their flash illumination is normally parallel to the axis of the optical path of the camera lens, such that the axial path of their flash illumination meets at or close to where the axis of the optical path of the camera lens meets a subject of the scene to be reproduced. This provides direct or nearly direct, and sometimes intense, illumination of the subject and scene, and is disadvantageous principally because round, curved or irregularly shaped surfaces such as those of a human face appear unnaturally flat. Also, direct lighting creates reproductions showing shadows behind or alongside the subject on nearby surfaces such as walls.

To overcome these problems associated with direct illumination, flash units have been pivotable, usually vertically, to direct light against and bounce it off a nearby surface such as a ceiling and provide indirect, more diffused illumination of the scene. Although this reduces the flat appearance and shows a much more natural appearance of roundness, since all of the light comes from a location far from the camera lens, it has the disadvantage of causing heavy shadows near irregular surfaces such as under eyebrows, chins, etc.

Another problem that arises from indirect, bounce-flash, illumination relates to the operation and effectiveness of sensory devices commonly fixedly-mounted on structures such as flash units which house the source of illumination. The sensors, usually electronic devices such as "electric eyes", respond to the camera-to-subject or-scene distance, and the particular scene's reflectivity, and determine and control the duration of flash illumination required. To be effective, the sensors must be pointed or directed toward the scene to be reproduced such that the axis of the sensing path meets say a subject of the scene at, as near as possible to, or in the vicinity of, where the axis of the optical path of the camera lens meets the subject. But, since sensors are usually fixedly-mounted to the flash unit, they are only dependably effective when flash illumination is direct. In bounce-flash work, the sensor is pointed away from the subject, say toward a ceiling, and it improperly controls flash duration based on input received from the ceiling, not the subject. Thus, indirect flash illumination from a flash unit having a fixed sensor not only produces shadows, but it also renders sensor readings inaccurate and sensors ineffective.

In view of these and other limitations of camera equipment and flash units which provide only either direct or indirect illumination, in a single direction only, it is an object of this invention to provide camera apparatus and methods which enable a single source of illumination to provide simultaneous direct and indirect illumination of a scene to be reproduced. Such illumination provides more realistic, more uniform lighting and allows one to eliminate or control both flatness and shadows on subjects, scenes and reproductions, as desired.

Another object of this invention is to provide a device which reflectively redirects a percentage of illumination from a source to indirectly illumine a scene to be reproduced, while allowing a percentage of the illumination from the source to directly illumine the scene to be reproduced.

Another object of this invention is to provide the aforementioned device having means which allow variable regulation and selection and control of the percentages of illumination which respectively directly and indirectly illumine the scene to be reproduced.

Another object of this invention is to provide a reflective device which reflectively redirects substantially all of the source-directed flash illumination away from its source-directed axial path aimed at the scene to be reproduced, to indirectly illumine a scene to be reproduced.

Another object of this invention is to provide the aforementioned devices which allow a reflective member to be interposed at one or more angles between the flash source and the scene to be reproduced, to reflectively redirect all or a percentage of the flash illumination from its source-directed path.

Another object of this invention is to provide the aforementioned devices wherein the reflective member includes passing means for allowing a percentage of the source-directed illumination to pass through the reflective member, and the reflective member has regulating means, for variably regulating the percentage of illumination passed through the reflective member.

Another object of this invention is to provide a device which allows the reflective member to be pivoted to vary its angle of interposition between the source of flash illumination and the scene to be reproduced.

Another object of this invention is to provide a device which allows the reflective member to be rotated in an arc whose approximate center point is the axis of the path of flash illumination, such that reflective redirection of the source-directed illumination can be at various degrees of the arc.

Another object of this invention is to provide a device in the form of a frame mountable on a flash unit and having wings which straddle the source of flash illumination and include means for removably mounting a reflective member onto the frame.

Another object of this invention is to provide the aforementioned devices with a pair of upwardly-disposed side walls which extend from the flash unit to the frame or reflective member.

Still another object of this invention is to provide the aforementioned device wherein the structure such as the flash unit which houses the source of illumination includes allowing means such as slots cooperative with the wings for allowing the frame to be pivoted between its open and closed positions.

Yet another object of this invention is to provide methods of effecting the aforementioned objectives.

These and other objects of this invention will be apparent as it is better understood from the description which follows, which, taken in conjunction with the drawings, discloses preferred embodiments thereof.

DETAILED DESCRIPTION OF THE INVENTION

Figure 1:
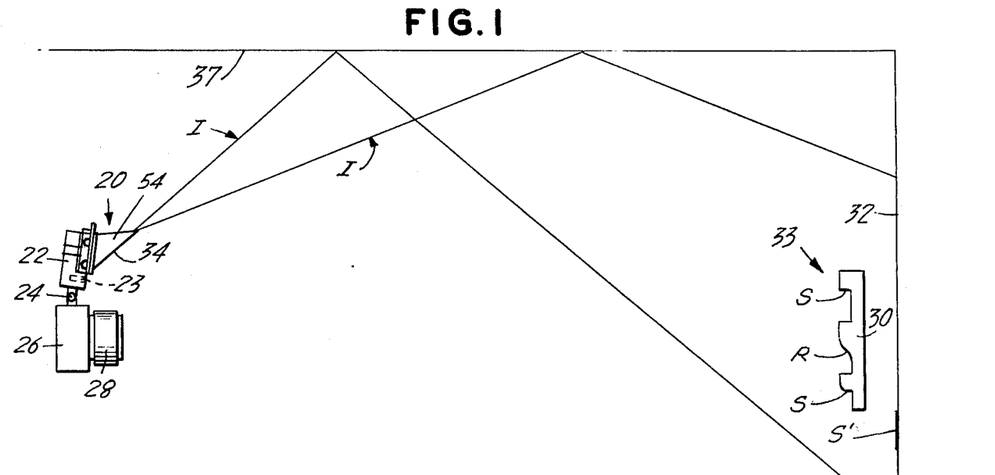
FIG. 1 is a schemtaic view showing an embodiment of a device of this invention mounted on a flash unit in turn mounted on a camera, during bounce-flash illumination of a scene which includes an irregularly shaped object.

Referring to the drawings in detail, FIG. 1 is a schematic view showing the operation of a flash unit-mounted embodiment of the device of this invention. More particularly, FIG. 1 shows a reflective device generally designated 20, mounted on a support or structure, which houses a source of illumination, such as flash unit 22, for illuminating a scene to be reproduced by a camera. Flash unit 22 having a sensor 23 need not but can be mounted by pivotable means 24 on a camera 26 having a lens generally shown at 28, the axis of whose optical path is directed at an irregularly-shaped subject 30 in front of a wall 32 of the scene 33 to be reproduced. As a reproduction is made, flash illumination I from flash unit 22, initially having a source-directed axial path, here shown as less than parallel to the axis of the optical path of lens 28, and which would meet the scene near where the axis of the optical path meets the scene, is intercepted and reflectively redirected by reflective member 34 interposed at an angle between the source of flash illumination (tube 36 of FIG. 3), housed in flash unit 22, and scene 33, such that reflectively redirected flash illumination I is bounced off a surface such as ceiling 37 to provide indirect illumination of subject 30. According to this invention, all, or substantially all, of the initial flash illumination can be reflectively redirected for indirect lighting of the scene, as shown in FIG. 1, or, as will be explained in relation to another embodiment of the device of this invention (FIG. 8), a percentage of flash illumination can be reflectively redirected, and a percentage of flash illumination D (dashed line, FIG. 8) can pass through a reflective member to directly illumine the subject and scene. FIG. 1 shows that when only indirect bounce-flash illumination I is provided, lighting is non-uniform and shadows S appear just below or under protruding and curved or rounded surfaces R of subject 30. Shadows S' also appear near the bottom of wall 32. If only direct flash illumination from flash unit 22, such as D (dashed line, FIG. 8) were provided, illumination would be too uniform because the source of illumination is too close to the camera lens and the reproduction would therefore appear flat. Alternatively, if the flash umit is removed from the camera location and is pointed at the scene, this direct illumination alone would cause heavy shadow areas which lack in detail. Further, direct illumination along often creates background shadows S' on backgrounds such as back wall 32.

Figures 2, 3:
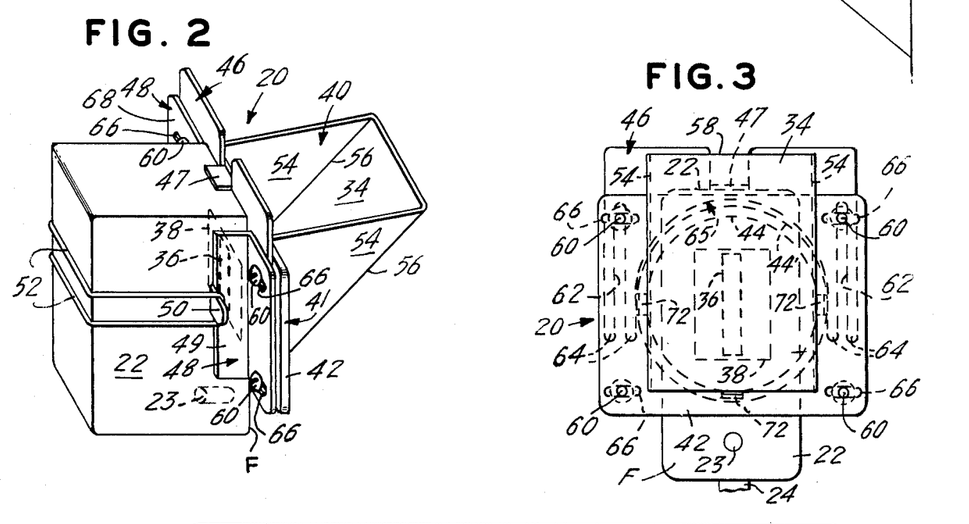
FIG. 2 is an enlarged perspective view showing the device and flash unit of FIG. 1.
FIG. 3 is a view taken from the right side of the device and flash unit of FIG. 2.

FIG. 2, an enlarged perspective view of the flash unit and device of FIG. 1, shows that reflective device 20 is comprised of reflective means generally designated 40 and mounting means generally designated 41 for fixedly or, preferably, as shown, removably mounting reflective device 20 particularly its reflective means 40 onto a support such as a camera or flash unit 22 preferably its face F. Mounting means 41 can include any suitable means for mounting reflective member 40 onto flash unit 22, for example, face plate 42 having an aperture 43 defined by rim 44 (FIG. 4), tressle-shaped vertical stabilizer 46 having an integral horizontally extending lug 47 resting on the top of flash unit 22, lateral stabilizer means 48 each having a stabilizer wall 49 and a lug 50, and a rubber band 52 extending around flash unit 22 and tied, fastened to, or looped around lugs 50. Lateral stabilizer means 48 include adjustable means, here, lateral openings 66 which render reflective device 20 and reflective means 40 adjustably mountable on flash units of various widths, and, stabilizer wall 49 which preferably abuts the side of flash unit 22 and stabilizes or prevents flash unit 22 and reflective device 20 from being laterally displaceable with respect to one another. Although mounting means 41 can also include means for altering the diameter of face plate aperture 43 (FIG. 4), preferably aperture 43 is large enough to encompass all or most commercial sources of flash illumination and surrounding flash reflectors, despite their various sizes, shapes and dimensions.

FIG. 2 shows that reflective means 40 is cradle-shaped and includes a pair of upwardly-disposed side walls 54, each having an angularly extending longitudional edge 56 which communicates with reflective member 34. Reflective member 34 extends upward and outward from flash unit 22 and is interposed at any suitable angle, preferably from about 40° to 50° or 60°, most preferably about 45°, from a line drawn perpendicular to the face of the flash unit, or parallel to the axis of the path of source-directed flash illumination (FIG. 1). Reflective member 34 is so mounted on flash unit 22 that it is interposed between the source of flash illumination, here electronic flash tube 36, and the scene to be reproduced, such that the reflective member is capable of intercepting the flash illumination from its source-directed path and reflectively redirecting all or at least a percentage of it to a ceiling or other "bounce" surface and thus provide indirect illumination of the scene to be reproduced. Side walls 54 one extending from one side and the other from the other side of reflective member 34, extend toward flash unit 22 and straddle flash tube 36 and flash unit reflector 38 to thereby contain flash illumination within their bounds and prevent the illumination from passing the reflective member edges and directly illuminating the scene to be reproduced.

Reflective device 20 can be constructed in any suitable manner. It can be made of opaque or semi-opaque material, it can be one-piece or integral, or it can be made of any suitable combination of pieces, so long as it has mounting means, and reflective means including a reflective member which as described, is interposed at an angle between the source and scene and reflectively redirects at least a percentage of the flash illumination directed against it. In the embodiment shown in FIG. 2, side walls 54 and reflective member 34 are integral, solid and non-transparent.

FIG. 3 is a front view of device 20 as it would be seen from the right side of FIG. 2. More particularly, FIG. 3 shows that the pair of side walls 54 are upwardly-disposed and straddle flash tube 36, face plate aperture 43, defined by rim 44 (dashed line), easily encompasses flash tube 36 and flash unit reflector 38, and upper edge 58 of reflective member 34 is well above flash tube 36 and flash unit reflector 38 to insure that all or substantially all illumination is reflectively redirected. Face plate 42 preferably is wider than reflective member 34 to facilitate mounting the reflective member thereonto such as by means of screws 60 which pass through face plate tapped holes 45 (FIG. 4), axial slots 62 in legs 64 of tressle-shaped vertical stabilizer 46, and lateral slots 66 in frontal pieces 68 of lateral stabilizer means 48.

Figure 4:
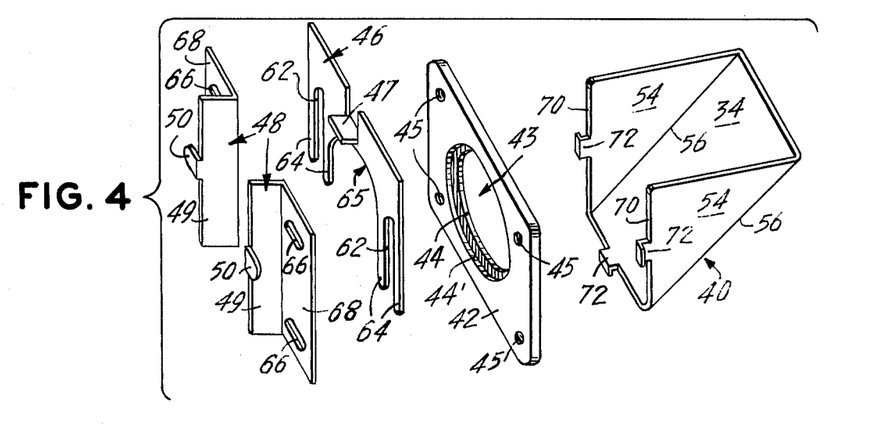
FIG. 4 is an exploded view of the device shown in FIG. 2.

FIG. 4 is an exploded perspective view of a reflective device 20 of this invention. More particularly, FIG. 4 shows that reflective means 40 is cradle-shaped and includes upwardly-disposed side walls 54, each side wall having an upstanding edge 70 which abuts face plate 42, and an angularly-extending longitudional edge 56 which communicates with a side edge portion of reflective member 34. Upstanding edges 70 and the bottom edge of reflective member 34 include suitable mounting means such as integral, bent tines 72 for mounting reflective means 40 and its reflective member 34 onto and relative to face plate 42 and onto and relative to a support such as the face F of flash unit 22. Face plate 42 preferably is stepped as shown, although it can be made of two joined, abutting and bonded or adhered plates with an angular gap in the aperture rim or from a single plate (not shown). Tines 72 are aligned with aperture 43 so that they can be passed therethrough and hooked over and behind rim 44 such that they point toward stepped rim 44' and claspingly engage rim 44 or a portion thereof (FIG. 5), and thereby rotatably mount reflective means 40 onto the face plate. This width of stepped rim 44' is equal to or greater than the thickness of tine 72 so that tine 72 does not protrude beyond the rear surface of face plate 42. This allows face plate 42 to closely abut vertical stabilizer 46. Tines 72 are slideable about the circumference of rim 44 without interference from vertical stabilizer 46 and allow reflective member 34 to be rotated in an arc whose center point is preferably approximately the axis of the path of flash illumination. By such rotation, the percentage of flash illumination can be reflectively redirected at or along various degrees in the arc, for example 90° or 180° about the axis of the path of flash illumination, for directing illumination off of a side wall or floor (not shown). This arrangement also provides for easy and quick removal of reflective member 40 from face plate 42 without removing the face plate and other mounting means from the flash unit, when it is desired to use a straight or direct rather than bounce-flash.

To the left of face plate 42 in FIG. 4 is tressle-shaped vertical stabilizer 46 having a horizontally extending lug 47 and axial slots 62 in legs 64 to either side of an archway 65 which is larger than face plate aperture 43. Slots 62 allow vertical stabilizer 46 to be slid vertically to allow lug 47 to rest on the top of flash units of various heights.

Shown at the far left of FIG. 4, is a pair of L-shaped lateral stabilizers 48 each comprising a stabilizer wall 49 having lug 50 thereon, and frontal pieces 68 having lateral openings 66 therein to allow the lateral stabilizers and reflective means 40 to accomodate flash units of various widths. Although FIG. 4 shows that the preferred mounting means includes face plate 42, vertical stabilizer 46 and lateral stabilizers 48, other suitable mounting means can be employed. For example, if face plate 42 were of a single thickness and without a step, spacer washers (not shown) could be provided between face plate 42 and vertical stabilizer 46.

Figure 5:
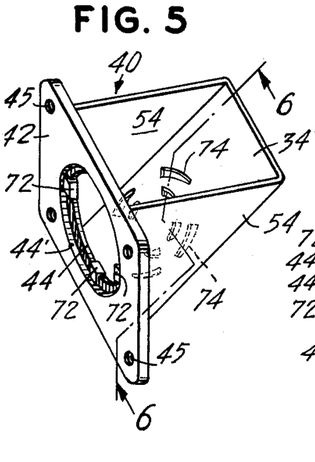
FIG. 5 is a perspective view of the reflective means mounted onto the face plate each shown at the right side of FIG. 4.

FIG. 5 is a perspective view of a modification of the reflective device of this invention. FIG. 5 shows reflective means 40 rotatably mounted by tines 72 claspingly engaging portions of rim 44 of face plate 42. Reflective member 34' is preferably non-transparent and includes any suitable passing means, for example, one or more perforations 74 which extend through the thickness of reflective member 34', for allowing a percentage of flash illumination to pass directly therethrough and provide some direct illumination of a scene to be reproduced. Thus, of the source-directed flash illumination that passes from the source through face plate aperture 43, a percentage is reflectively redirected by the unperforated portions of non-transparent reflective member 34', and a percentage is simultaneously passed through perforations 74, to provide some direct lighting and therefore uniform overall lighting of the scene to be reproduced. FIG. 5 also shows the manner in which bent tines 72 are hooked over and behind and claspingly engage rim 44 to allow the tines and reflective member 34' to be rotated about an arc whose center point is approximately the axis of the path of flash illumination. The passing means broadly includes any suitable means in or on a reflective member which passes illumination therethrough. For example, the passing means can be transparent or translucent portions of a partly transparent reflective member having non-transparent portions, voids, regardless of their size, shape or make up, that is, including large ones, such as those stencil or mask-formed, and including minute, microscopic or smaller interstitial transparent or translucent areas in coated, vapor-desposited or otherwise, treated, etched or natural reflective member surfaces, or in material or materials of which the reflective member is made, for example the areas between silver-like particles of partly reflective mirrors, and between particles of or impregnated into reflective member materials.

Figures 6, 6A:
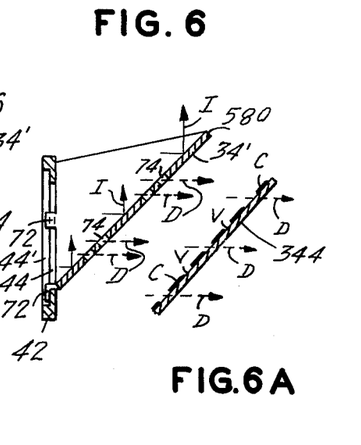
FIG. 6 is a cross-sectional view taken substantially along line 6—6 through the reflective member of the reflective means shown in FIG. 5.
FIG. 6A is a cross-sectional view with portions broken away, as would be taken substantially along line 6—6 of an alternative embodiment of a reflective member of this invention.

FIG. 6 is a cross-section taken along line 6—6 of FIG. 5. More particularly, FIG. 6 shows that perforations 74 allow a percentage of source-directed flash illumination, dashed lines D, to pass through reflective member 34' for direct illumination of a scene, and that the non-apertured, solid, non-transparent portions of reflective member 34', reflectively redirect a percentage of the source-directed flash illumination toward a surface such as a ceiling (not shown), such that the reflectively redirected illumination I indirectly illumines the scene to be reproduced. FIG. 6 shows that upper edge 580 of reflective member 34' is high enough relative to the upper portion of rim 44 to prevent illumination from spilling over the reflective member and directly illuminating a scene.

Reflective members 34 and 34' (and 340, 340', 342 and 3400, FIGS. 12–18) can be made of any suitable material or combination of materials. For example, they can be constructed of any reflective material, preferably a highly reflective opaque material such as polished metal or the like. The reflective member can also be constructed of a semi-opaque or translucent material or a combination of materials. For example, reflective member 344, FIG. 6A, can be a normally transparent material such as a plastic or glass substrate or backing B having surface portions that have been treated, for example, coated with a suitable non-transparent, reflective coating material C, such as a silver-containing or like material, which coating can have passing means such as void V therein for allowing a percentage of flash illumination (dashed lines D) to pass therethrough and directly illumine a scene. An example of a partially transparent material would be a partially reflective, partially transparent mirror or mirror-like material wherein the voids V (not shown) are microscopic openings between the mirror-providing silver-like particles on the surface or impregnated in the mirror materials. As will be explained in relation to FIG. 13, the reflective members and reflective means of this invention can be made of other suitable materials as well.

Figure 7:
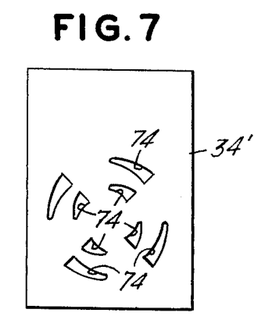
FIG. 7 is a front view of the reflective member shown in FIG. 5 as would be taken from the right side of FIG. 5.

FIG. 7 is an end view of reflective member 34' as would be taken from the right side of FIG. 5. More particularly, FIG. 7 shows preferred sizes, shapes and locations of perforations 74, arranged in one or more circular concentric patterns, one pattern including perforations which are similarly-shaped, but differently sized than those of the other pattern.

Although perforations 74 can be of any suitable number, size, shape and location, and can be arranged in any suitable pattern, it has been found advantageous to so situate the perforation or perforations, that the direct illumination which passes therethrough provides a diffused, uniform illumination of a scene, rather than say a speckled or linear, non-uniform illumination wherein the pattern of perforations of the reflective member would be mirrored, transposed or duplicated on the scene to be reproduced.

Figure 8:
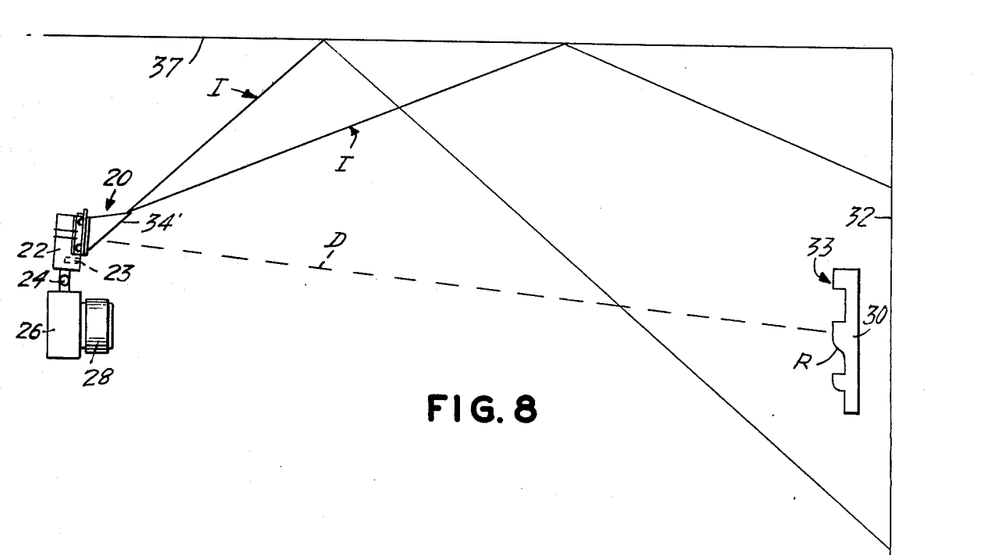
FIG. 8 is a schemtaic view similar to FIG. 1, showing a modification of the device of this invention.

FIG. 8 is a schematic view which shows the operation of and advantages provided by reflective member 34' of the reflective device shown in FIGS. 5–7. More particularly, FIG. 8 shows that, of the source-directed flash illumination, a percentage of the flash illumination, dashed lines D, passes through reflective member perforations 74 (not shown) and directly illumines subject 30 and back wall 32, and, a percentage of the source-directed flash is reflectively redirected by the unperforated non-transparent portions of reflective member 34', such that the reflectively redirected illumination I bounces off of ceiling 37 and simultaneously indirectly illumines object 30 and back wall 32 of the scene to be reproduced. Thus, reflective member 34' allows a single source of flash illumination, bulb 36, to provide simultaneous direct and indirect illumination of the scene. FIG. 8 shows the advantages that reflective device 20 provides over either only direct or only indirect illumination. Simultaneous direct and indirect flash illumination from a single source provides more uniform lighting because the percentage of direct illumination D is usually relatively small and partially illumines shadows caused by lights bounced from the ceiling, and the percentage of indirect illumination I provides general lighting which falls in, on and around irregularly shaped surfaces R and naturally renders and shows the roundness of these surfaces. Resulting reproductions do not appear flat. They appear naturally rounded. Also, as shown in FIG. 8, most shadows under most irregular surfaces, such as shadows S of FIG. 1, are filled in so that desired details are shown. Another advantage provided by reflective member 34' is that indirect, bounce-flash illumination is provided while flash unit 22 and sensor 23 are directed or aimed at the subject or scene to be reproduced. Reflective member 34' therefore allows sensor 23 to function effectively by remaining pointed at and controlling flash illumination based on data received from the subject or scene to be reproduced. For these reasons, reflective member 34' provides improved single source flash illumination of subjects and consequently provides improved reproductions thereof, as compared to prior art flash units and devices which offer only alternative direct or indirect illumination.

Figure 9:
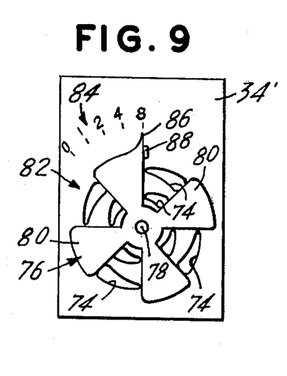
FIG. 9 is a front view of the reflective member of FIG. 7 having a shutter rotatably mounted thereon.

FIG. 9 is an end view of reflective member 34' of FIGS. 5–8, having regulating means mounted thereon, preferably including movable shutter means, for example, a solid, non-transparent, fan-shaped movable shutter 76 rotatably mounted on reflective member 34' by suitable removable, or, non-removable means such as rivet 78. Fan-shaped shutter 76, including its blades 80 and openings or interstitial gaps 82 which are variously alignable and cooperative with the passing means, here, perforations 74, for variably regulating the percentage of illumination passed through the reflective member. Shutter 76 preferably also includes means such as tab 88 which extends away from the reflective member and shutter and facilitates rotation of shutter 76 relative to reflective member 34'. Reflective member 34' and shutter 76 each have suitable indicia means thereon, for example, a series of numerals 0, 1, 2, 4 and 8 and hash marks thereunder on reflective member 34', both generally designated 84, and apex 86 of a shutter blade 80. Indicia 84 and 86 are alignable and cooperative with each other to indicate for each relative alignment thereof, the approximate percentage of illumination passed through reflective member 34'. Shutter 76 and perforations 74 are so constructed and cooperatively positioned that shutter 76 is movable to a series of related indicia positions, indicated by the numerals and hash marks, wherein at each position, the percentage of flash illumination allowed to pass through perforations 74 varies from an adjacent position according to a geometric progression. Thus, numerals 0, 1, 2, 4 and 8 indicate that the percentage of illumination allowed through perforations 74 when apex 86 is aligned with each respective number is about 0, 1, 2, 4 and 8 percent of the total of source-directed flash illumination.

At the shutter position shown in FIG. 9, all blades 80 completely overlie the solid, unperforated portions of reflective member 34' and therefore allow the maximum flash illumination possible through the particular perforations 74. The maximum illumination possible, for any perforated reflective member depends of course on selected and desired size, shape, number and pattern of perforations. For the particular concentric pattern shown, basically tear drop-shaped perforations, wherein those of the outer circular pattern are larger than those of the inner, the maximum direct illumination is about 8 percent of the total of the source-directed flash illumination.

Figure 10:
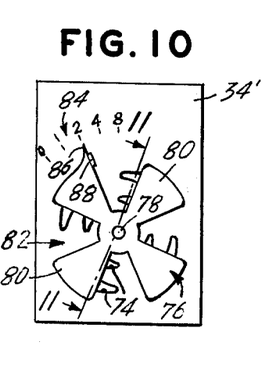
FIG. 10 shows the shutter of FIG. 9 in a rotated position to prevent some illumination from passing through apertures of the reflective member.

FIG. 10, an end view of reflective member 34' and shutter 76 of FIG. 9, shows shutter 76 rotated to a position wherein portions of blades 80 overlie portions of perforations 74 and, as indicated by indicia 84, allow about 2 percent of the source-directed flash illumination to pass through open portions of perforations 74. Those solid, unperforated, non-transparent portions of blades 80 which cover perforations 74 and prevent illumination from passing therethrough, being part of the reflective means, cooperate with the reflective member in reflectively redirecting about 98 percent of the source-directed flash illumination.

In the preferred embodiments shown in FIGS. 5-7, 9-11 and 13, all perforations are similarly shaped and are arranged in circular concentric patterns, the larger ones being in the outer and the smaller ones in the inner circular pattern, such that rotation of shutter 76 causes blades 80 to simultaneously overlie an equal proportion of each perforation, and of each portion of the percentage of illumination that would pass therethrough. Since each perforation is simultaneously proportionately affected and since each perforation has a shape which graduates from say its narrow tail end to its widest blunted leading end, rotation of shutter 76 a pre-determined number of degrees in an arc, gradually increases or decreases the amount of illumination passed or blocked by the amount of the aforementioned geometric progression. Although the percentage of illumination desired to be passed through the perforations in a particular situation depends on many factors, such as ambient lighting conditions, the type, reflectivity, location of and distance between the camera and particular subject to be reproduced, and between the camera and the reflective surface, such as the ceiling, from which the illumination is bounced. For taking indoor flash photographs of a human face at distances of from about 4 to 15 feet with normally available equipment, unusually successful reproductions have been obtained when as little as from about 2 to 4 percent of the total of source-directed flash illumination is passed through perforations 74, and the remainder of the total is reflectively redirected off of a ceiling by the unperforated, non-transparent portions of reflective member 34' and of shutter 76. By use of from about 2 to 4 or 8 percent of direct and the rest indirect flash illumination, photographs of a human face show that the lighting of the face is soft, diffused, uniform and unshadowed, yet appropriately rounded and not flat.

Figure 11:
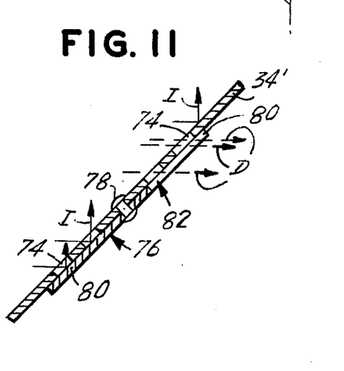
FIG. 11 is a cross-section as would be taken substantially along line 11—11 of FIG. 10.

FIG. 11, a cross-section taken along line 11—11 of FIG. 10, illustrates that unperforated, non-transparent portions of reflective member 34' and of shutter blade 80 intercept and reflectively redirect a large percentage of flash illumination from a flash source (not shown) to provide indirect illumination I of a scene (not shown), while a small percentage of the flash illumination is allowed to pass through perforations 74 and shutter gaps 82, to simultaneously provide direct illumination D of the scene. Two dashed lines D are shown passing through the larger uppermost perforation while only one dashed line D is shown passing through the lower perforation, to indicate that the perforations of the radially outer-most pattern are larger than and allow more light through than the smaller perforations of the radially inner pattern. FIG. 11 shows that although a very minute portion of the source-directed flash illumination may not in fact be reflectively redirected by shuttter blades 80 due to interference by upper portions of the rims or edges which define perforations 74, the interfered-with portions are considered negligible and insignificant relative to the total flash illumination provided and reflectively redirected.

Figures 12, 13:
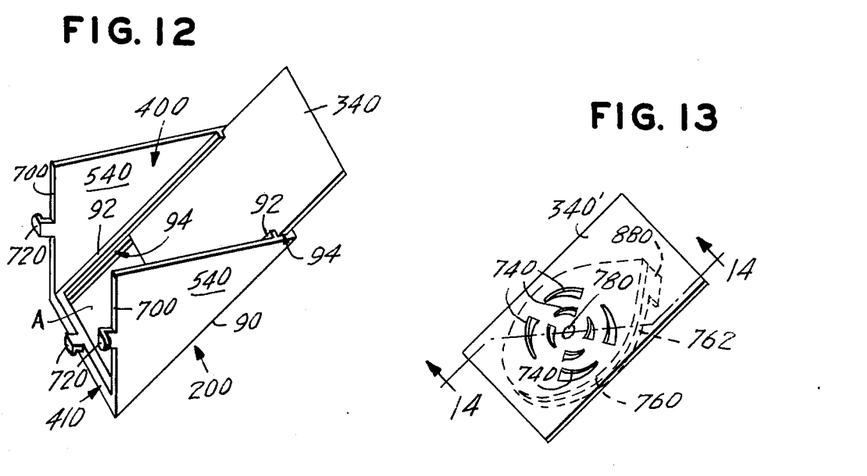
FIG. 12 is a perspective view of another embodiment of the device of this invention.
FIG. 13 is a perspective view of a perforated reflective member having movable shutter means rotatably mounted thereon.

FIG. 12 is a perspective view of another embodiment of the device of this invention. More particularly, FIG. 12 shows a reflective device, generally designated 200, which includes reflective means generally designated 400, which in turn includes reflective member mounting means such as frame, generally designated 410, for mounting a reflective member 340 onto the reflective means and onto a support such as a flash unit (not shown) in a manner that allows reflective member 340 to be interposed at an angle between the source of flash illumination and the scene to be reproduced (each not shown), such that the reflective member will intercept flash illumination from its source-directed path and reflectively redirect at least a percentage of it to provide indirect illumination of the scene to be reproduced. Frame 410 can include a horizontal base, and upstanding wings 540 which extend toward the flash unit on which the frame is to be mounted, and which straddle a source of flash illumination housed in the flash unit. Each wing 540 reflects some of the source-directed flash illumination and includes an angularly extending longitudinal edge 90 and includes adjacent the edge, any suitable removable mounting means, for example, track 92, for removably mounting reflective member 340 onto frame 410. Each track 92 includes a groove 94 which track and groove are parallel to and face each other and define an open reflective member mounting area A there-between for cooperatively slidingly receiving into mounting area A a reflective member 340 that is adapted to be slid into and out of engagement with tracks 92. Reflective member 340 is in the form of a sheet adapted to be slid fully into track 92. FIG. 12 shows that reflective member 340 can be removably mounted onto the track and removed therefrom and replaced by another reflective member such as one with other reflective characteristics. Reflective member 340 can be solid and non-transparent such as reflective member 34, it can have passing means therein like reflective member 34', it can be partially reflective and partially transparent, and it can include movable shutter means such as for example shutter 76.

Preferably, reflective member 340 is partially transparent. For example, it can be a normally transparent lens made of a material such as of glass, plastic or the like, impregnated, pigmented or vacuum-treated, or coated with microscopic non-transparent particles, droplets or crystals, which reflectively redirect a percentage of flash illumination while allowing a percentage of the flash illumination to pass through the interparticle interstices. Reflective member 340 can be a material specially treated to be capable of polarizing light passing through it, such as used in filters and like glare-reducing lenses. Examples of such specially treated lenses are those manufactured and sold by Polaroid Corporation under the trademark Polaroid.

Frame 410 is similar to that of cradle-shaped reflective means 40 of FIG. 4 in that wings 540 have upstanding edges 700 which include mounting means such as tines 720 for pivotably mounting frame 410 into a support such as a flash unit. Tines 720 can be inserted through aperture 43 and pivotably mounted onto rim 44 of face plate 42 of FIG. 5. The means for removably mounting a reflective member onto frame 410 can be any suitable means including but not limited to snaps, clips, friction and hinge devices.

Figures 14, 15:
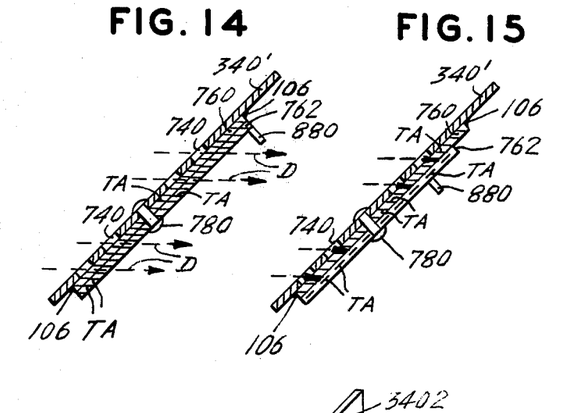
FIG. 14 is a cross-section taken substantially along line 14—14 of FIG. 13.
FIG. 15 is a cross-section as would be taken along line 14—14 of FIG. 13 were the movable shutter means rotated to allow less illumination to pass therethrough.

FIG. 13 is a perspective view of reflective member 340' which can be made of a non-transparent material, for example, a foil-coated paperboard, having passing means such as perforations 740 therein, similar in size, shape and arrangement to perforations 74 of FIGS. 5–7 and 9–11. The passing means, here, perforations 740 can be of any suitable type, size, shape and arrangement which will permit the maximum direct illumination desired. Mounted onto reflective member 340' are regulating means, here, shown as a pair of polarizer sheets, first polarizer sheet 760 which is fixed or stationary by being integral with, or, as shown, fixed or secured to the reflective member by any suitable means such as adhesive 106, and, adjacent thereto, second polarizer sheet 762 which is movable relative to the first for example by being rotatably mounted onto the reflective member, and relative to first sheet 760, by any suitable means such as rivet 780. Polarizer sheets 760, 762 are shown as tear drop-shaped but can be of any suitable shape. First sheet 760 can be in sections which correspond to and are mounted within perforations 740. Perforated reflective member 340' with first and second polarizer sheets 760, 762 can, like reflective member 340, be slid into and out of groove 92 of reflective means 400 (FIG. 12). Sheets 760, 762 are cooperative with each other and with perforations 740, for variably regulating the percentage of flash illumination reflectively redirected by, and the percentage passed through the perforations. Each polarizer sheet preferably is constructed of a transparent, birefringent, highly dichroic material which substantially sorts the vertical and perpendicular light wave vibrations of the unpolarized light or illumination from the flash source that it intercepts, and illumination passed through each respective polarizer sheet is linearly polarized. As shown in FIG. 14, when the transmission axes TA of first and second polarizer sheets 760 and 762 are parallel, say horizontal, substantially all of the flash illumination that passes through perforations 740 is transmitted through the polarizer sheets as light polarized to vibrate linearly along a single, say, horizontal, axis for directly illuminating a scene to be reproduced. To regulate, for example, to decrease the amount of light transmitted or allowed through the polarizer sheets, that is, the amount of direct illumination, second polarizer sheet 762, bearing tab 880, is rotated relative to sheet 760. As sheet 762 is rotated relative to the first, the angle between transmission axes of sheets 760, 762 changes, say, increases from an angle of 0° at sheet positions wherein the transmission axes of the respective sheets are parallel, to sheet positions wherein they are at 90°, and progressively less light passed through and linearly polarized by sheet 760 is alloed to pass through sheet 762. At 90° (FIG. 15), when the transmission axes of each sheet are at right angles relative to each other, such as when those of sheet 762 are vertical, practically no illumination, say as little as 0.01% is transmitted or passed to the scene through second polarizer sheet 762. Thus, rotation of the second polarizer sheet relative to the first permits variable regulation of the percentage of linearly polarized source-directed flash illumination passed through reflective member 340'. In an alternative embodiment (not shown), reflective member 340 (FIG. 12) can be a first polarizer sheet and another polarizer sheet, say 762, is rotatably mounted thereon.

Figure 16:
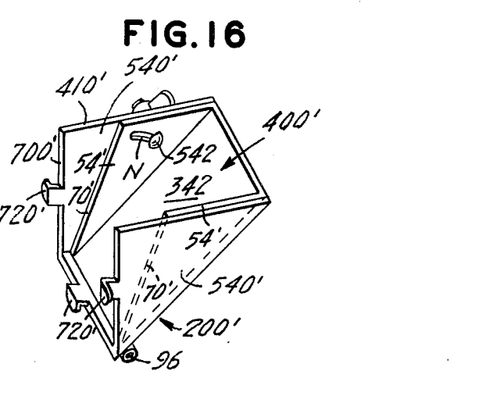
FIG. 16 is a perspective view of another embodiment of the device of this invention.

FIG. 16 is a perspective view of another embodiment of the device of this invention. More particularly, FIG. 16 shows a reflective device, generally designated 200', which includes reflective means 400' and mounting means including frame 410' and pivotable means for pivotably mounting reflective member 342 onto the frame and onto a support such as a flash unit (not shown) in a manner that allows reflective member 342 to be pivotably interposed at various angles between a source of flash illumination and a scene to be reproduced to allow reflective redirection at various angles of percentage of flash illumination according to this invention. Frame 410' is similar to frame 410 of FIG. 2 and includes upstanding wings 540', upstanding edges 700' and tines 720'. Reflective means 400' is cradle-shaped as in FIG. 2 and also includes reflective member 342 and a pair of integral, upwardly-disposed side walls 54' whose longitudinal edges 70' need not be but are cut at an angle away from frame longitudional edges 700'. The pivotable means include adjustable hold means cooperative with the frame and the side walls, for adjusting the reflective member angle. The adjustable hold means includes a hole (not shown) in one of the wings 540', cooperative notch N of any suitable length cut arcuately in a corresponding side wall 54', wing nut W, and screw 542 whose shank passes through the notch and hole and is threadedly engaged by wing nut W. The pivotable means also includes hinge 96 having portions integral with or secured to reflective means 400' and the base of frame 410'. The pivotable means are adjustable by loosening wing nut W, and pivoting the reflective member to a desired angle by allowing the shank to slide through notch N. When the desired angle is reached, it is held by tightening wing nut W. The embodiment shown in FIG. 16 therefore allows reflective member 342 to be pivoted at its base and moved relative to wings 540' toward a flash source or scene to be reproduced for interposition at various angles therebetween, for reflectively redirecting flash illumination at various angles and taking bounce-flash reproductions at various distances from a scene. As an alternative version (not shown) side walls 54' can include tracks such as 92 (FIG. 12) for slideably receiving a reflective member such as 340.

Figure 17:
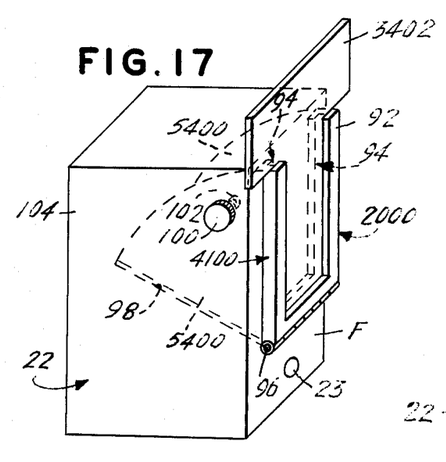
FIG. 17 is a perspective view of another embodiment of a device of this invention pivotably mounted on a flash unit.

FIG. 17 shows another embodiment of the reflective device of this invention. More particularly, FIG. 17 shows a flash unit 22 having pivotably mounted onto its face F, a reflective device 2000 having mounting means which includes a frame, generally designated 4100, which includes upstanding wings 5400 (similar to wings 540 except they do not include tines), track 92 having a groove 94, and, hinge 96 secured to the base of frame 4100 and to flash unit 22. A T-shaped reflective member 3400 is removably mounted onto the frame by being fully seated within track grooves 94 such that its horizontal upper portion 3402 whose length is greater than the distance between and is above and rests on tracks 92. Flash unit 22 includes allowing means, here a pair of slots 98 which extend perpendicularly onto the face and into flash unit 22, for cooperating with the wings for allowing the frame to be pivoted between its open and closed positions. Wings 5400 straddle the source of flash illumination (not shown) and are seated within slots 98 which also straddle the flash source and are aligned with and shaped to accomodate a wing therein. The mounting means includes pivotable means here hinge 96, which is similar to and operates as in FIG. 16, and also includes adjustable retaining means cooperative with a wing for allowing the frame to be pivotably adjusted to various positions which vary the angle of interposition of reflective member 3400 removably onto frame 4100. The adjustable retaining means can for example include a set screw 100 and tapped hole 102 in flash unit side surface 104. Set screw 100 is threaded into and through hole 102 and abuts wing 5400 and frictionally holds it in the desired position. In FIG. 17, wings 5400 are fully seated in slots 98 and reflective device 2000 is in the closed position.

Figure 18:
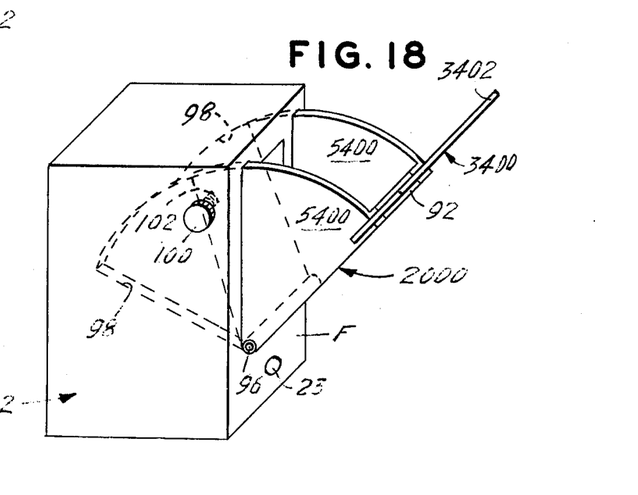
FIG. 18 is a perspective view of the device of FIG. 17, shown pivoted to an open position.

FIG. 18 shows reflective device 200 of FIG. 17 in an open position. Set screw 100 has been loosened, the upper portion of frame 4100 has been pivotably moved out away from flash unit face F and screw 100 has been tightened or threaded inwardly again to abut and frictionally hold frame 4100 in the open position. Horizontal upper portion 3402 is designed to allow frame 4100 to be pivoted downwardly to a point at which illumination from the flash source would normally spill over reflective member such as 340 (FIG. 12) whose top edge would be even with the top of tracks 92. Horizontal upper position 3402 allows frame 4100 to be pivoted to a low position, as for long distance, indirect illumination of a scene to be reproduced. Reflective member 3400 can be solid or perforated, it can have movable shutters mounted thereon, and it can be made of any suitable material to reflectively redirect all or any desired percentage of flash illumination. Frame 4100 can be pivotably mounted onto flash unit 22 by any suitable means. For example, wings 5400 could slide alongside and straddle the side surfaces 104 of flash unit 22.

From the foregoing it is realized that this invention includes methods of providing direct, and indirect bounce flash illumination of a scene to be reproduced by a camera. The method comprises interposing a reflective member at an angle between the source and the scene to intercept the source-directed flash illumination from its source-directed path, and utilizing the reflective member for reflectively redirecting at least a percentage of the source-directed flash illumination to indirectly illumine the scene to be reproduced, and for allowing a percentage of the source-directed flash illumination to pass through the reflective member to simultaneously directly illumine the scene. The allowance of flash illumination to pass through the reflective member can be effected by providing passing means in the reflective member. The method can include any or all of the steps of providing means such as movable shutter means for variably regulating the percentage of flash illumination to pass through the reflective member, for varying the angle at which the reflective member is interposed between the source of flash illumination and the scene, for rotating the reflective member onto a flash unit, for rotating the reflective member about an arc whose center point is aproximately the axes of the path of flash illumination, and for removably mounting the reflective member onto a flash unit.

It is thought that the invention and many of its attendant advantages will be understood from the aforegoing description and it will be apparent that various changes may be made in the methods, materials and in the form, construction and arrangement of the parts without departing from the spirit and scope of the invention or sacrificing all of its material advantages, the steps and forms hereinabove described being merely preferred embodiments thereof.

I claim:

1. A reflective device for use with a source of illumination for illuminating a scene to be reproduced by a camera, which comprises:

reflective means including a reflective member having side edge portions and upwardly-disposed sidewalls each having an angularly-extending longitudional edge which communicates with a reflective member side edge portion, and mounting means for mounting the reflective means on a support such that the reflective member is interposed at an angle between the source and the scene and intercepts the source-directed illumination from its source-directed path and reflectively redirects at least a percentage of it to provide indirect illumination of the scene to be reproduced.

2. The reflective device of claim 1 wherein the reflective member includes passing means for allowing a percentage of the source-directed illumination to pass through the reflective member to directly illumine the scene.

3. The reflective device of claim 2 wherein the reflective member includes regulating means mounted on the reflective member and cooperative with the passing means for variably regulating the percentage of illumination passed through the passing means of the reflective member.

4. A reflective device for use with a flash unit which houses a source of flash illumination for illuminating a scene to be reproduced by a camera, wherein the axis of the source-directed path of flash illumination is in a direction which would meet the scene at or close to where the axis of the optical path of the camera lens meets the scene, which comprises:

reflective means including a reflective member which includes passing means for allowing a percentage of the flash illumination to pass through the reflective member to directly illumine the scene, regulating means mounted on the reflective member and cooperative with the passing means for variably regulating the percentage of illumination passed through the passing means of the reflective member, and mounting means for mounting the reflective means onto the flash unit such that the reflective member is interposed at an angle between the source and the scene and intercepts the flash illumination from its source-directed path and reflectively redirects at least a percentage of it to provide indirect illumination of the scene to be reproduced.

5. The reflective device of claim 4 wherein the reflective member reflectively redirects substantially all of the flash illumination.

6. The reflective device of claim 4 wherein the passing means includes one or more perforations in the reflective member.

7. The reflective device of claim 4 wherein the reflective member has transparent portions and reflective portions and the passing means are the transparent portions.

8. The reflective device of claim 7 wherein the reflective member is comprised of a transparent substrate having a reflective coating thereon, and the reflective portions are provided by the reflective coating and the transparent portions by voids in the reflective coating.

9. The reflective device of claim 4 wherein the regulating means includes movable shutter means.

10. The reflective device of claim 4 wherein the reflective member is not transparent and the passing means includes one or more perforations in the reflective member.

11. The reflective device of claim 10 wherein the regulating means includes movable shutter means having blades and gaps between the blades, and wherein the blades and gaps are variously alignable with the one or more perforations for variably regulating the percentage of illumination respectively reflectively redirected by and passed through the reflective member.

12. The reflective device of claim 4 wherein the reflective member and the regulating means each have indicia means thereon, the respective indicia means being alignable with each other to indicate for each relative alignment thereof, the approximate percentage of illumination passed through the reflective member.

13. The reflective device of claim 4 wherein the regulating means and the passing means each have indicia means thereon and are so constructed and cooperatively positioned with respect to the indicia means that the movable regulating means is movable to a series of related indicia positions wherein at each position, the percentage of illumination allowed to pass through the passing means varies according to a geometric progression.

14. The reflective device of claim 12 wherein the regulating means and the passing means are so constructed and cooperatively positioned with respect to the indicia means that the movable regulating means is movable to a series of related indicia positions wherein at each position, the percentage of illumination allowed to pass through the reflective member directly to the scene varies according to a geometric progression.

15. The reflective device of claim 4 wherein the flash unit has a face and the mounting means includes means for rotatably mounting the reflective member onto the face such that the reflective member is rotatable in an arc whose center point is approximately the axis of the path of flash illumination such that the percentage of flash illumination can be reflectively redirected along various degrees of the arc.

16. The reflective device of claim 4 wherein the reflective member is normally transparent and has portions that are treated with a reflective material, and the passing means are voids in the reflective material.

17. The reflective device of claim 4 wherein the regulating means includes a pair of polarizer sheets, a first which is fixed to the reflective member and a second which is rotatably mounted relative to the first, each polarizer sheet being cooperative with the other and with the passing means and being constructed of a material having transmission axes which linearly polarize illumination that is passed respectively therethrough, the percentage of illumination which passes through the passing means and the first polarizer sheet and which is allowed to pass through the second polarizer sheet for direct illumination of the scene, can be regulated by rotation of the second sheet relative to the first to thereby vary the angle of transmission axes of the second sheet relative to the angle of those of the first.

18. The reflective device of claim 4 wherein the reflective means is cradle-shaped and includes a pair of upwardly-disposed side walls, one extending from each side of the reflective member, each side wall having an upstanding edge, and an angularly extending longitudional edge communicating with the reflective member, the side walls being so positioned that each extends toward the flash unit and straddles the source, and the reflective member extends outwardly at an angle from the flash unit, between the source of flash illumination and the scene.

19. The reflective device of claim 18 wherein the mounting means includes a frame having upstanding wings which straddle the source of flash illumination and the reflective means side walls, and pivotable means for pivotably mounting the reflective member onto the frame such that the reflective member can be pivotably interposed at various angles between the source of flash illumination and the scene for reflective redirection of at least a percentage of the source-directed flash illumination at various angles.

20. The reflective device of claim 19 wherein the frame includes a horizontal base and the pivotable means includes a hinge secured to the base and reflective means, and adjustable hold means cooperative with the wings and side walls for adjusting and holding the reflective member angle.

21. The reflective device of claim 4 wherein the flash unit a face, and the mounting means includes a face plate mountable on the flash unit face, the face plate having means for mounting the reflective means thereonto, and having a rim defining an aperture which is larger than and alignable with the source of flash illumination to allow the flash illumination to pass therethrough, and wherein the reflective means is cradle-shaped and includes a pair of upwardly-disposed side walls one extending from each side of the reflective member, each side wall having an upstanding edge, and an angularly extending longitudional edge communicating with the reflective member, the side walls being so positioned that each extends toward the flash unit and straddles the source of flash illumination, and the reflective member extends outwardly at an angle from the flash unit, between the source of flash illumination and the scene.

22. The reflective device of claim 21 wherein the mounting means also include means for rotatably mounting the reflective means onto the face plate to allow the reflective member to be rotated in an arc whose center point is approximately the axis of the path of flash illumination to allow the percentage of flash illumination to be reflectively redirected along various degrees in the arc.

23. The reflective device of claim 22 wherein the means for rotatably mounting the reflective means onto the face plate are tines which are integral with and extend from the side wall upstanding edges and are hooked over and claspingly engage the face plate aperture rim.

24. A reflective device for use with a flash unit which houses a source of flash illumination for illuminating a scene to be reproduced by a camera, which comprises:
   reflective means, and
   mounting means for mounting the reflective means onto the flash unit in a manner that allows a reflective member to be interposed at an angle between the source and the scene such that the reflective member will intercept flash illumination from its source-directed path and reflectively redirect at least a percentage of it to provide indirect illumination of the scene to be reproduced, the mounting means including a frame having upstanding wings which extend toward the flash unit and straddle the source, each wing having an angularly-extending longitudional edge each in turn having removable mounting means for removably mounting a reflective member onto the frame, the longitudional edges defining an open reflective member mounting area therebetween.

25. The reflective device of claim 24 wherein the removable mounting means on each wing includes a track, each track being positioned parallel to and facing each other for cooperatively slidingly receiving a reflective member adapted to be slid into and out of engagement therewith.

26. The reflective device of claim 24 wherein each track includes a groove, and the reflective member is slideable into and out of the groove.

27. The reflective device of claim 24 wherein the reflective means includes a reflective member removably mounted onto the frame in a manner that allows the reflective member to be interposed at an angle between the source and scene such that the reflective member will intercept the flash illumination from its source-directed path and reflectively direct at least a percentage of it to provide indirect illumination of the scene to be reproduced.

28. The reflective device of claim 27 wherein the reflective member is non-transparent and reflectively redirects substantially all of the source-directed flash illumination.

29. The reflective device of claim 27 wherein the reflective member is not transparent and includes passing means for allowing a percentage of the flash illumination to pass through the reflective member to directly illumine the scene, the reflective member having mounted thereon regulating means cooperative with the passing means for variably regulating the percentage of flash illumination respectively reflectively redirected by and passed through the reflective member.

30. The reflective device of claim 24 wherein the flash unit has a face and includes allowing means cooperative with the wings for allowing the frame to be pivoted between its open and closed positions, and wherein the mounting means includes pivotable means for pivotably mounting the frame onto the flash unit such that a reflective member can be pivotably interposed at various angles between the source of flash illumination and the scene for reflectively redirecting a percentage of source-directed flash illumination at various angles.

31. The reflective device of claim 30 wherein the allowing means includes a pair of slots in the flash unit face which straddle the flash source, each slot being aligned with and having a shape which accomodate and house a wing therein, wherein the pivotable means includes a hinge secured to the flash unit and frame, and wherein the mounting means also includes adjustable retaining means cooperative with a wing for allowing the frame to be pivotably adjusted to various positions which vary the angle of interposition of a reflective member removably mounted onto the frame.

32. The reflective device of claim 31 wherein the reflective means includes a reflective member removably mounted onto the frame in a manner that allows the reflective member to be interposed at an angle between the source and scene such that the reflective member wll intercept the flash illumination from its source-directed path and reflectively direct at least a percentage of it to provide indirect illumination of the scene to be reproduced.

33. The reflective device of claim 32 wherein the reflective member is non-transparent and reflectively redirects substantially all of the source-directed flash illumination.

34. The reflective device of claim 24 wherein the removable mounting means on each wing includes a track, each track being positioned parallel to and facing each other for cooperatively slidingly receiving a reflective member adapted to be slid into and out of engagement therewith.

35. The reflective device of claim 32 wherein the reflective member is T-shaped and has a horizontal upper portion whose length is greater than the distance between and is above and rests on the tracks.

36. The reflective device of claim 11 wherein the reflective member and the blades each have indicia means thereon, the respective indicia means being alignable with each other to indicate for each relative alignment thereof the approximate percentage of illumination passed through the reflective member.

37. The reflective device of claim 15 wherein the reflective member rotatable mounting means includes a face plate mounted against the flash unit face.

38. The reflective device of claim 15 wherein the face plate includes a rim which defines a face plate aperture longer than and alignable with the source to allow the flash illumination to pass through the aperture.

39. The reflective device of claim 38 wherein the mounting means include tines provided on the reflective means and cooperative with the face plate aperture rim for rotatably mounting the reflective means onto the face plate.

* * * * *